(12) United States Patent
Fukui et al.

(10) Patent No.: US 6,342,741 B1
(45) Date of Patent: Jan. 29, 2002

(54) COOLING STRUCTURE OF FAN MOTOR

(75) Inventors: Masashi Fukui, Ashikaga; Atsushi Shimura, Gunmamachi; Hirobumi Matsumura, Utsunomiya, all of (JP)

(73) Assignee: Mitsuba Corporation, Kiryu (JP)

( * ) Notice: Subject to any disclaimer, the term of this patent is extended or adjusted under 35 U.S.C. 154(b) by 0 days.

(21) Appl. No.: 09/574,220

(22) Filed: May 19, 2000

(30) Foreign Application Priority Data

May 21, 1999 (JP) .......................... 11-141487

(51) Int. Cl.[7] .................................. H02K 9/00
(52) U.S. Cl. ....................... 310/60 A; 310/89
(58) Field of Search ................ 310/52, 58–60 A, 310/89, 91

(56) References Cited

U.S. PATENT DOCUMENTS 5,019,737 A * 5/1991 Bruno .......................... 310/89
5,327,036 A * 7/1994 Carey .......................... 310/89
6,175,171 B1 * 1/2001 Rupp et al. ................... 310/52

FOREIGN PATENT DOCUMENTS

| JP | A 8-340654 | 12/1996 |
| JP | A 9-74718 | 3/1997 |

* cited by examiner

Primary Examiner—Tran Nguyen
(74) Attorney, Agent, or Firm—Oliff & Berridge, PLC

(57) ABSTRACT

A fan motor has an end case having an annular recess. An air passage hole is formed in the annular recess defined by axially outer and inner tubular guide walls formed on the end case. A cover member covering the air passage hole is provided on a fan shroud. First and second ring-shaped ribs are integrally formed on the side of the cover member facing the end case, so as to form a labyrinth structure in cooperation with an open end of a motor yoke and with the radially outer peripheral surface of the annular recess.

20 Claims, 4 Drawing Sheets

COOLING STRUCTURE OF FAN MOTOR

BACKGROUND OF THE INVENTION

1. Field of Invention

The invention relates to a cooling structure of a fan motor which is used, for example, as an automotive electric part.

2. Description of Related Art

In general, a fan motor of the kind mentioned above is disposed in an engine compartment and is arranged to cool an engine. Because the fan motor runs at high power, it is necessary that the motor have a forced intake of external air (cooling air) into the interior of the motor so as to enhance heat dissipation inside the motor. To this end, for example, a fan motor cooling structure has been proposed in JP-A-9-74718, wherein a motor yoke has a cooling air intake port provided at a lower portion of an open end thereof. Alternatively, JP-A-8-340654 discloses a cooling structure in which a cooling air inlet is formed in an upper portion of an end case which is provided at its one side with brush holders, and an end frame having an air vent hole formed in a lower portion thereof is provided on the other side of the end case, wherein cooling air drawn through the air vent hole is introduced into an annular space formed between the end frame and the peripheral surface of a bearing portion of the end case. The cooling air is then introduced into the motor via the cooling air inlet.

In the first-mentioned known structure, the cooling air intake port is formed on the lower portion of the interior of the motor, and cooling air is led to the interior of the motor by way of a labyrinth structure having a relatively short air flow path from the cooling air intake port. Therefore, although this arrangement is superior in cooling performance, the arrangement is inferior in waterproofing and dust-proofing the motor.

On the other hand, in the second-mentioned known cooling structure, external cooling air is introduced into the gap between the end frame and the end case through the air vent hole positioned at the lower portion of the end frame, and the introduced cooling air is led to the interior of the motor through the cooling air inlet located at the upper portion of the end case. Therefore, the cooling air is introduced into the interior of the motor through a spiraling passage so as to swirl around the bearing unit, along a comparatively long labyrinth structure. That is, the arrangement according to the latter publication provides a labyrinth having a relatively long air flow path. Accordingly, although the arrangement is superior in waterproofing and dust-proofing characteristics, the arrangement is inferior in air flow and cooling performance because cooling air is introduced into a restricted path that extends from a single intake port at the lower portion of the end frame upward via the annular gap. Further, as the end frame and the brush holders constitute part of a labyrinth structure within the motor assembly, the structure of the motor is complicated and bulky. Thus, both of the above arrangements suffer from a cumbersome structure and cannot simultaneously achieve superior cooling performance and superior waterproof and dust-proof performance.

SUMMARY OF THE INVENTION

The invention seeks to solve the problems described above.

According to one aspect of the invention, there is provided a cooling structure of a fan motor, including a cylindrical case which is open at one end and is closed by an end closure at the other end in a longitudinal direction, the end closure having air exhaust ports; an end case which closes the open end of the cylindrical case, the end case having at least one air passage hole; a cover member disposed in the vicinity of the end case so as to cover the air passage hole; and ring-shaped ribs disposed between the cover member and the end case so as to form a labyrinth structure; whereby air is set to flow into the periphery of the cover member, inside the cylindrical case through the labyrinth structure and through the air passage hole, and to be discharged through the exhaust ports of the cylindrical case.

With this arrangement, it is possible to simultaneously achieve high cooling performance as well as superior waterproof and dust-proof characteristics within the motor.

The arrangement may be such that the end case is provided at its side adjacent to the cylindrical case with brush holders and a bearing holder for holding a bearing to support an armature shaft of the fan motor, the end case being recessed towards the cylindrical case so as to provide an annular recess in which the at least one air passage hole is formed, and wherein the ring-shaped ribs including a first ring-shaped rib and a second ring-shaped rib are provided on the cover members, the first ring-shaped rib loosely fitting over the outer periphery of the open end of the cylindrical case and the second ring-shaped rib adjacently opposing the inner peripheral surface of the annular recess on the outer diametrical side, whereby the cooled air is set to flow into the outer periphery of the cover member, inside between the cover member and the end case, and through the labyrinth structure made up of the first and second ring-shaped ribs, the open end of the cylindrical case and the annular recess, then from the air passage hole into inside the cylindrical case and then to be is discharged through the exhaust ports. With this arrangement better cooling performance can be achieved.

The first ring-shaped rib has a cutout for positively taking in the cooled air, resulting in providing an improved cooling performance. Preferably, an air guide plate is formed on the cutout of the first ring-shaped rib so as to guide the cooled air towards the cutout.

The arrangement may be such that the cover member is fixed to a fan shroud to which the fan motor is attached. This arrangement makes it possible to complete the cooling structure simply by mounting the fan motor on the fan shroud. Preferably, the air passage hole formed in the ring-shaped recess of the end case is defined by an axially elongated tubular guide wall which cooperates with the second ring-shaped rib in forming therebetween a part of the labyrinth structure. With the arrangement better waterproof and dustproof performance can be achieved. The end case is made of a resin material and has the brush holders and the bearing holder formed therein.

The above and other objects, features and advantages of the invention will become clear from the following description when the same is read in conjunction with the accompanying drawings.

DETAILED DESCRIPTION OF PREFERRED EMBODIMENTS

Figure 1:
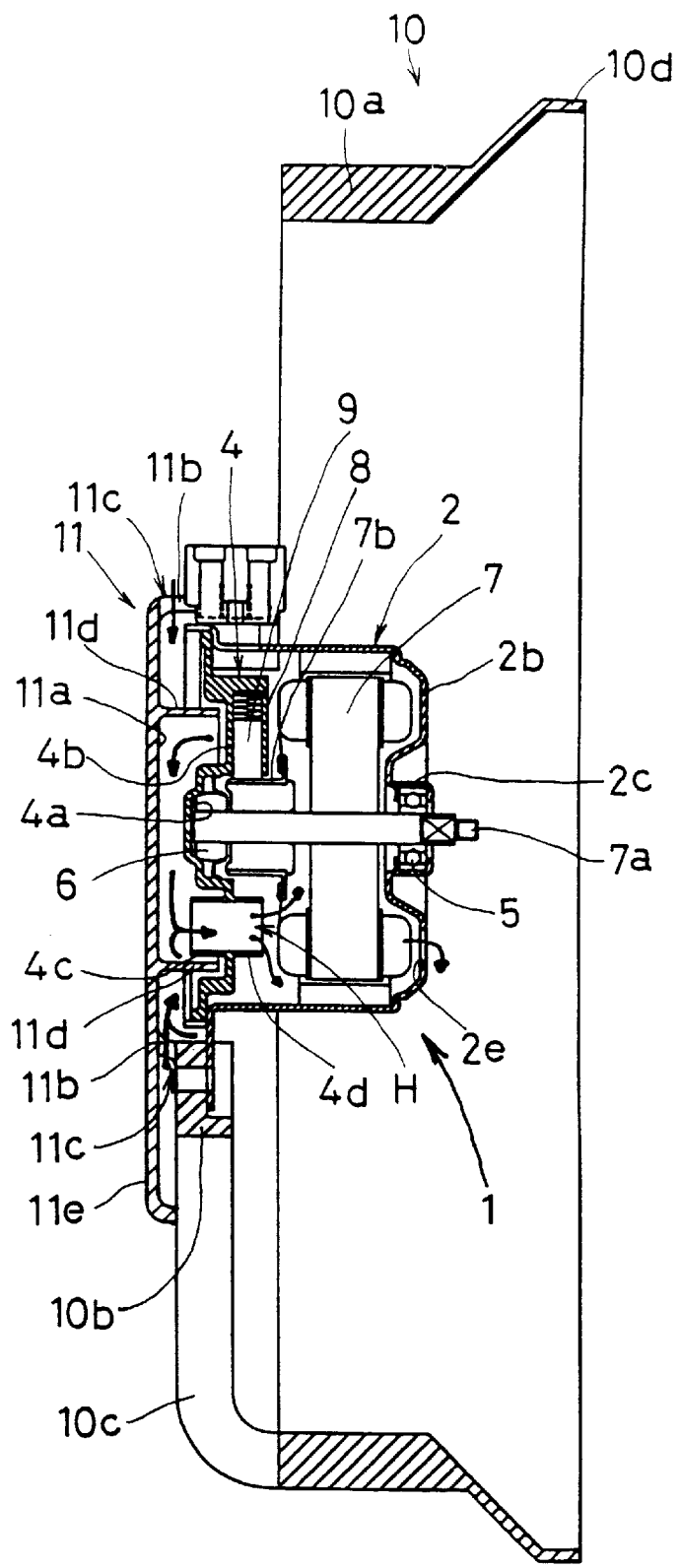
FIG. 1 is a sectional side elevational view of a fan motor.

An embodiment of the invention will be described with reference to FIGS. 1 to 4.

Referring to the drawings, a fan motor 1 incorporating the invention has a yoke 2 which corresponds to the cylindrical case in the sense of the invention and which is formed into a cylindrical shape opened at its one axial end as at 2a (FIG. 3) but is closed at the other axial end. The yoke 2 has a permanent magnet 3 affixed to the inner wall thereof The open end 2a of the yoke 2 is covered with an end case 4. A rotor shaft 7, which in this case is an armature shaft, is journaled at both ends by bearings 5 and 6 which are respectively disposed in a bearing portion 2c formed in the closed end 2b of the yoke 2 and in a later-mentioned bearing holder recess 4a, corresponding to the bearing holder of the invention, formed in the end case 4. More specifically, the end of the rotor shaft 7a supported by the bearing 5 projects to the outside of the motor 1 through the end closure 2b of the yoke, and a fan (not shown) is affixed to the projecting end of the rotor shaft 7a so as to be driven by the motor, as in the case of conventional fan motors.

The end case 4 is formed by a unitary molding with a resin material into a disk shape. The central region of the end case is bulged axially outward, i.e., away from the motor 1, so as to provide a small-diameter cylindrical protrusion which defines therein the aforementioned bearing holder recess 4a. As stated before, the bearing holder recess 4a receives the bearing 6 which supports one end of the rotor shaft 7a which is opposite to the fan. There are four brush holders 8 that are formed in the same side of the end case 4 as the bearing holder recess 4a, i.e., in the axially inner side of the end case 4, at the radially outer side of the recess 4a. The brush holders 8 are arranged at an equal interval in the circumferential direction. Thus, the end case 4 serves also as a holder stay. Each of the brush holders 8 holds a brush which serves as a positive electrode or a negative electrode which can be used for feeding electricity from the outside to the rotor. The brushes 9 are provided in the brush holders 8 so as to be movable in the radial directions and are urged radially inward by urging springs 9a, so that radially inner ends of the brushes 9 projecting from the inner side surfaces of the brush holders 8 are held in contact with outer surfaces of commutator rings 7b, which are fixed to the outer periphery of the rotor shaft 7 at a position near the end of the rotor shaft 7 carried by the bearing 6.

The outer peripheral edge portion of the end case 4 is axially protruded outward so as to form an annular recess 4b between the bearing holder recess 4a and the outer peripheral edge portion of the end case 4, i.e., at the radial position corresponding to the position of the brush holders 8. An air passage hole H is formed in the end case 4 so as to penetrate the annular recess 4b at a position between a pair of the lowermost brush holders 8a. The brims of the air passage hole H are axially extended outward and inward, respectively, so as to provide an outer tubular guide wall 4c and an inner tubular guide wall 4d. The outer tubular guide wall 4c projects outward to an axial position substantially the same as the outer face of the portion of the end case 4 defining the bearing holder recess 4a, while the inner tubular guide wall 4d projects axially inward to an axial position substantially the same as the surface of the axially inner wall of the brush holders 8. The end case 4 incorporating the brushes 9, urging springs 9a and electricity feeder members (not shown) has the radially outer end fitting in the brim of the open end 2a of the yoke 2. As will be best seen from FIG. 4, the radially outer end of the yoke 2 is locally bent so as to provide a plurality of radial mounting tabs 2d. The bottom or the end closure of the yoke 2 is provided with a plurality of air discharge ports 2e which are arranged around the aforesaid bearing portion 2c.

Reference numeral 10 indicates a fan shroud. The fan shroud 10 is unitarily formed of a resin material. The fan shroud 10 has a covering portion 10a having a large cylindrical shape disposed to cover the outer periphery of the fan motor 1, a motor supporting portion 10b having substantially an annular shape and affixed to the mounting tabs 2d of the yoke 2, and connecting ribs 10c extending radially at four points on the circumference of the covering portion 10a so as to interconnect the motor supporting portion 10b and the covering portion 10a. A cover member 11, which also is a constituent of the fan motor cooling structure of the invention, is provided on the radially inner end of the motor supporting portion 10c integrally therewith, so as to be disposed in the close proximity to the axially outer face of the end case 4 and so as to cover the air passage hole H.

The mounting tabs 2d of the yoke 2 are fastened to the motor supporting portion 10b of the fan shroud 10 by suitable fixing means such as screws, whereby the motor 1 is attached to the fan shroud 10. At the same time, as will be best seen from FIG. 2(A), the portion of the motor shroud 10 remote from the cover member 11 is radially spread outward to provide a substantially square flange 10d which in turn is provided with shroud mounting tabs 10e integral therewith. The shroud ring mounting tabs 10e are fastened to a stationary part by means of screws or other suitable fixing means, whereby the whole assembly including the fan motor is fixed to the stationary part.

The cover member 11 has a disk-like shape, the axially inner surface 11a of the cover member 11 faces the axially outer face of the end case 4 across a predetermined small gap. A substantially tubular first ring-shaped rib 11b extends from the radially outer end portion of the axially inner surface 11a of the cover member 11. The axially inner end of the first ring-shaped rib 11b is integrally connected to the radially inner end of the motor supporting portion 10b. Thus, the first ring-shaped rib 11b serves as a member which interconnects the cover member 11 to the fan shroud 10. The arrangement is such that the first ring-shaped rib 11b and the open end 2a of the yoke 2 overlap each other in the radial direction, so that a radial gap S1 is formed therebetween, as will be seen from FIG. 3, thus allowing cooling air to flow into the space between the end case 4 and the cover member 11. The first ring-shaped rib 11b is provided at its upper and lower portions with cutout portions 11c which serve as cooling air inlets through which ambient air as the cooling air is forcibly induced into the space between the end case 4 and the cover member 11.

A second ring-shaped rib 11d is also formed on the axially inner surface 11a of the cover member 11 at the radially inner side of the first ring-shaped rib 11b concentrically therewith. The second ring-shaped rib 11d has an axially inner end which does not contact with but is located in the close proximity to the axially outer surface of the annular recess 4b of the end case 4, so that the second ring-shaped rib 11d partially overlaps the side walls of the annular recess 4b when viewed in the radial direction. Thus, the second ring-shaped rib 11d radially confronts, across a predetermined gap S2, the peripheral wall surface of the annular recess 4b which faces radially inward. The aforesaid outer tubular guide wall 4c defining the air passage hole H opens to a space radially inside the second ring-shaped rib 11d. Thus, the outer surface of the guide wall 4c faces the radially inner surface of the second ring-shaped rib 11d across a small gap. The arrangement is such that the first ring-shaped rib 11b, the open end 2a of the yoke, the annular recess 4b of the end case 4, and the second ring-shaped rib 11d in cooperation form part of a labyrinth structure. At the same time, the second ring-shaped rib 11d and the outer tubular guide wall 4c form part of the labyrinth structure.

Figure 2A:
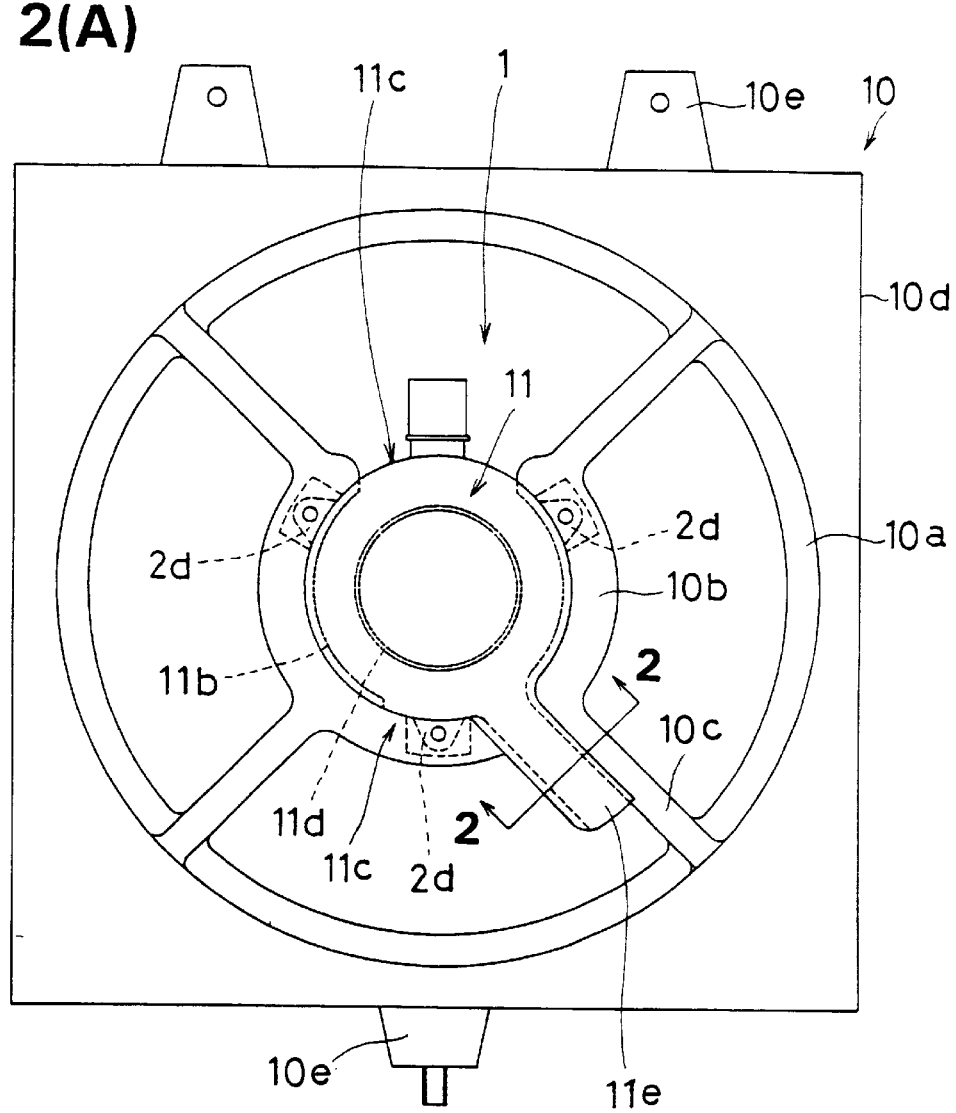
FIG. 2(A) is a rear view of the fan motor.
Figure 2B:
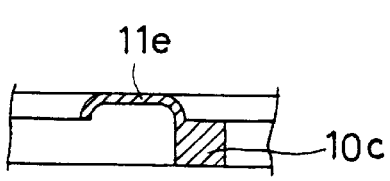
FIG. 2(B) is a cross-section taken along line 2—2 in FIG. 2(A)
Figure 3:
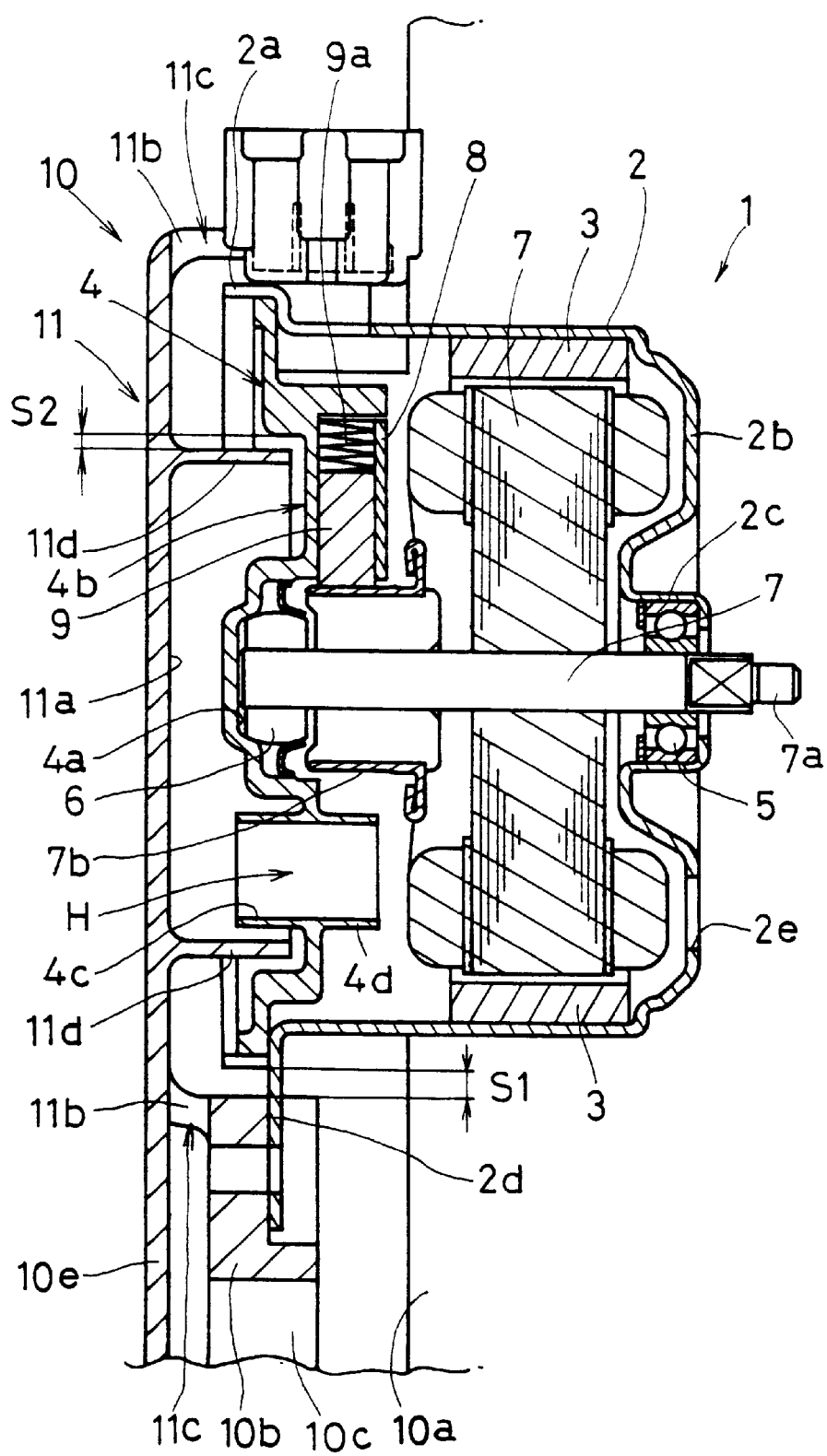
FIG. 3 is an enlarged sectional side elevational view of the fan motor.
Figure 4:
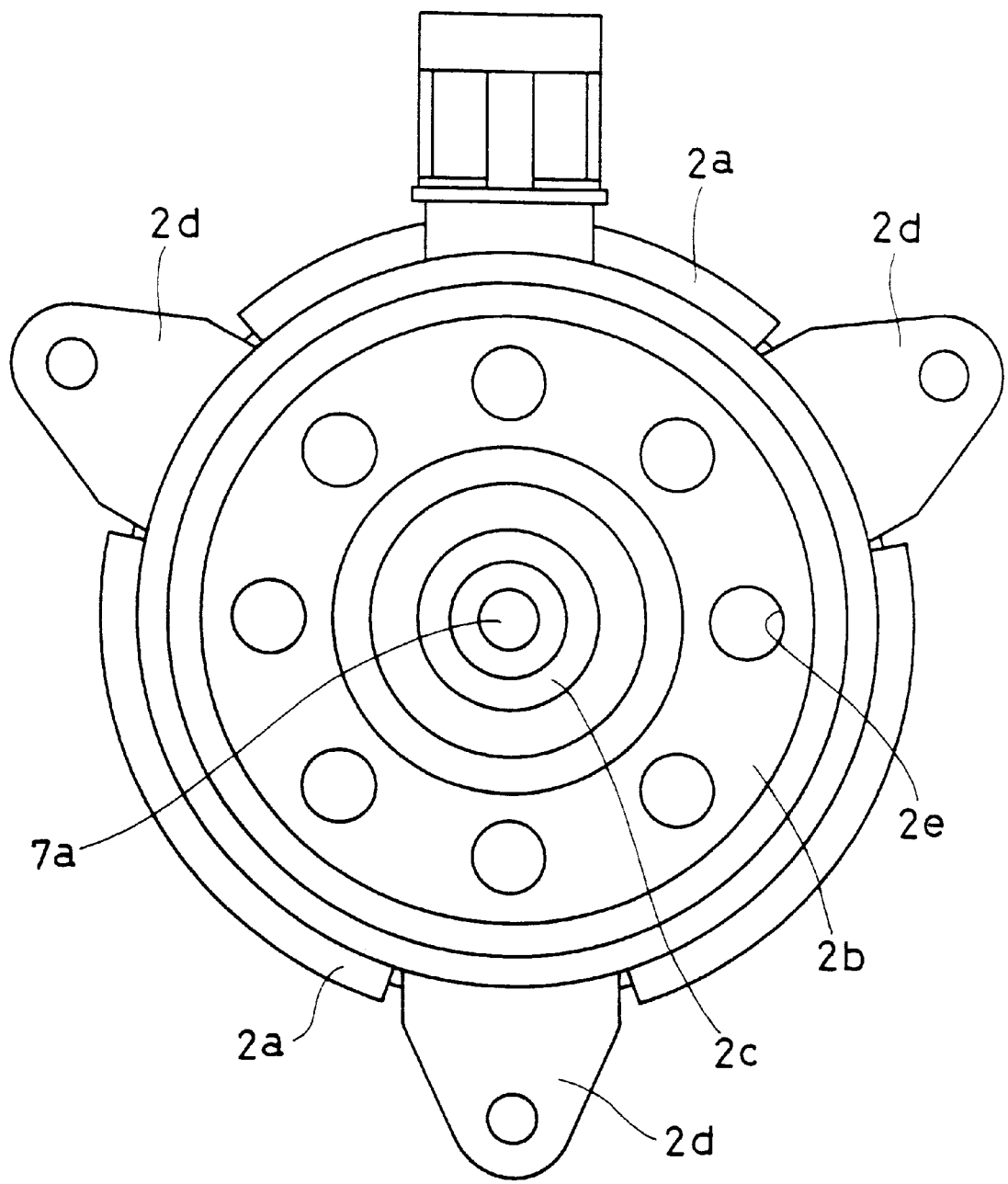
FIG. 4 is a front view of the fan motor.

As will be best seen from FIG. 2A, a portion of the radially outer end of the cover member 11 which faces the lower cooling air inlet 11c is extended radially outward so as to provide an air guide plate 11e, the radially outer end extremity of which is bent towards the fan motor 1. One radially extending edge of the air guide plate 11e is bent towards the fan shroud connecting portion 10c, thereby preventing cooling air from escaping, whereby ambient air around the lower peripheral part of the cover member 11 is forcibly guided and induced towards the cooling air inlet 11c.

In operation, the fan motor 1 drives the fan which is not shown, so as to create a flow of air. As a consequence, the cooling air flows through the annular gap S1 defined between the first ring-shaped rib 11b of the cover member 11 and the open end 2a of the yoke 2 of the fan motor 1, into the space inside the cover member 11 along the open end 2a of the yoke 2. The air then flows axially inward along the second ring-shaped rib 11d and then through the annular gap S2 between the second ring-shaped rib 11d and the inwardly facing peripheral wall surface of the annular recess 4b of the end case 4. The air is then deflected to flow through a minute gap between the axially inner end extremity of the second ring-shaped rib 11d and the bottom surface, i.e., the surface facing axially outward, of the annular recess 4b of the end case 4, into the space defined by the radially inner surface of the second ring-shaped rib 11d and the axially outer surface of the end case 4. Thus, the cooling air flows into the space inside the second ring-shaped rib 11d via the labyrinth structure which effectively serves to remove water and dust. The cooling air thus entering the space inside the second ring-shaped rib 11d is introduced into the motor, i.e., into the space defined by the end case 4 and the yoke 2 of the fan motor 1, through the air passage hole H formed in the end case 4. Since further labyrinth structure is formed by the second ring-shaped rib 11d and the outer tubular guide wall 4c, in particular the radially outer surface of the guide wall 4c, any residual water and dust are further removed when the air flows into the motor, whereby the rotor 7, brushes 9 and so forth are effectively cooled by the air which is almost free of water and dust. The cooling air after cooling the motor components is then discharged through the discharge ports 2e formed in the bottom 2b of the yoke 2.

In the described embodiment, the cooling air inlets 11c are formed both in the upper and lower portions of the first ring-shaped rib 11b, so that the cooling air can be induced not only through the annular gap S1 between the yoke open end 2a of the fan motor 1 and the first ring-shaped rib 11b but also through the cooling air inlets 11c as indicated by arrows in FIG. 1. Consequently, cooling air is forcibly introduced into the motor via the air passage hole H, thereby achieving further improvement in the cooling performance.

As stated before, the fan motor 1 itself generates heat which has to be dissipated by means of cooling air introduced into the fan motor. It is necessary that any moisture content and dust carried by the air be minimized before the air enters the motor. In accordance with the described embodiment, the cooling air is allowed to reach the space inside the second ring-shaped rib 11d via the labyrinth structure which is constituted by the first ring-shaped rib 11b, the open end 2a of the yoke 2, the annular recess 4b of the end case 4, and the second ring-shaped rib 11d. This labyrinth path has a length large enough to sufficiently reduce the moisture content and dust, thus offering sufficient waterproof and dust-proof effects. In addition, unlike the conventional arrangement in which the cooling air is introduced through a single air intake provided in a lower portion of an end frame, the described embodiment allows the air to be introduced over the entire circumference of the cover member 11, thus achieving high cooling effect. It is thus possible to obtain a highly reliable fan motor which simultaneously satisfies both the anti-water and anti-dust performance and high cooling performance.

In addition, the cooling air is introduced not only through the gap S1 defined between the outer peripheral surface of the open end 2a of the motor yoke 2 and the first annular rib 11b, but also through the cooling air inlets that are formed both in the upper and lower portions of the first ring-shaped rib 11b, thus attaining a further improvement in the cooling performance. The air guide plate 11e of the cover member 11 which is associated with the lower cooling air inlet 11c effectively serves to guide the cooling air into the lower cooling air inlet 11c, contributing to the further improvement in the cooling performance.

The labyrinth structure formed by the second ring-shaped rib 11d and the outer tubular guide wall 4c serves to further remove moisture and dust from the cooling air flowing into the motor.

It is also to be appreciated that, in the illustrated embodiment, the cover member 11 is integral with the fan shroud 10 to which the fan motor 1 is attached. It is therefore possible to secure the cover member 11 on the fan motor 1 simply by fixing the fan motor 1 to the fan shroud 10. This eliminates any work which hitherto has been required to complete the waterproof structure, thus contributing to an improvement in efficiency during assembly.

Although the invention has been described using its preferred form, it is to be understood that the described embodiment is only illustrative and various changes and modifications may be imparted thereto without departing from the scope of the invention.

What is claimed is:

1. A cooling structure of a fan motor, comprising:
   a cylindrical case open at one end and closed by an end closure at the other end in a longitudinal direction, the end closure having air exhaust ports;
   an end case closing the open end of the cylindrical case, the end case having at least one air passage hole;
   a cover member disposed in the vicinity of and covering the end case to include the air passage hole; and
   ring-shaped ribs disposed between the cover member and the end case so as to form a labyrinth structure;
   whereby air flows into the periphery of the cover member, through the labyrinth structure and the air passage hole into the cylindrical case, and is discharged through the exhaust ports of the cylindrical case.

2. The cooling structure of a fan motor according to claim 1, wherein the cover member is fixed to a fan shroud to which the fan motor is attached.

3. The cooling structure of a fan motor according to claim 2, wherein the air passage hole formed in the ring-shaped recess of the end case is defined by an axially elongated tubular guide wall which cooperates with the second ring-shaped rib in forming therebetween a part of the labyrinth structure.

4. The cooling structure of a fan motor according to claim 2, wherein the end case is made of a resin material and further comprises brush holders and a bearing holder formed therein.

5. The cooling structure of a fan motor according to claim 1, wherein the end case is made of a resin material and further comprises brush holders and a bearing holder formed therein.

6. The cooling structure of a fan motor according to claim 1, wherein the end case is provided at its side adjacent to the cylindrical case with brush holders and a bearing holder for holding a bearing to support an armature shaft of the fan motor, the end case being recessed towards the cylindrical case so as to provide an annular recess, the at least one air passage hole formed in the annular recess, and wherein the ring-shaped ribs comprising a first ring-shaped rib and a second ring-shaped rib are provided on the cover member, the first ring-shaped rib loosely fitting over the outer periphery of the open end of the cylindrical case and the second ring-shaped rib adjacently opposing the inner peripheral surface of the annular recess on an outer diametrical side, whereby the cooled air is set to flow into the outer periphery of the cover member, inside between the cover member and the end case, and through the labyrinth structure comprised of the first and second ring-shaped ribs, the open end of the cylindrical case and the annular recess, then from the air passage hole into inside the cylindrical case and then to be is discharged through the exhaust ports.

7. The cooling structure of a fan motor according to claim 6, wherein the first ring-shaped rib has a cutout for positively taking in the cooled air.

8. The cooling structure of a fan motor according to claim 7, wherein an air guide plate is formed on the cutout of the first ring-shaped rib so as to guide the cooled air towards the cutout.

9. The cooling structure of a fan motor according to claim 7, wherein the cover member is fixed to a fan shroud to which the fan motor is attached.

10. The cooling structure of a fan motor according to claim 7, wherein the air passage hole formed in the ring-shaped recess of the end case is defined by an axially elongated tubular guide wall which cooperates with the second ring-shaped rib in forming therebetween a part of the labyrinth structure.

11. The cooling structure of a fan motor according to claim 7, wherein the end case is made of a resin material and further comprises brush holders and a bearing holder formed therein.

12. The cooling structure of a fan motor according to claim 8, wherein the cover member is fixed to a fan shroud to which the fan motor is attached.

13. The cooling structure of a fan motor according to claim 8, wherein the air passage hole formed in the ring-shaped recess of the end case is defined by an axially elongated tubular guide wall which cooperates with the second ring-shaped rib in forming therebetween a part of the labyrinth structure.

14. The cooling structure of a fan motor according to claim 8, wherein the end case is made of a resin material and further comprises brush holders and a bearing holder formed therein.

15. The cooling structure of a fan motor according to claim 6, wherein the cover member is fixed to a fan shroud to which the fan motor is attached.

16. The cooling structure of a fan motor according to claim 15, wherein the end case is made of a resin material and further comprises brush holders and a bearing holder formed therein.

17. The cooling structure of a fan motor according to claim 6, wherein the air passage hole formed in the ring-shaped recess of the end case is defined by an axially elongated tubular guide wall which cooperates with the second ring-shaped rib in forming therebetween a part of the labyrinth structure.

18. The cooling structure of a fan motor according to claim 6, wherein the end case is made of a resin material and further comprises brush holders and a bearing holder formed therein.

19. A cooling structure for a fan motor, comprising:

a yoke having a closed first end and an open second end, the first end having a plurality of openings therein;

an end case for closing the second end of the yoke, the end case having an annular recess surrounding a centralized bearing holder; and a cover member, the cover member mounted to the yoke and extending beyond an outer circumference of the end case, the cover member having a radially outer first rib and a radially inner second rib extending toward the end case, the first rib having at least two openings for entry of air and the second rib extending into but not contacting the recess of the end case, wherein the relationship of the end case and the cover member provide a labyrinth air flow path for air entering the yoke.

20. The cooling structure according to claim 19, wherein the end case further has a cylindrical air passage hole passing through the recess and the second rib of the cover member faces an outer wall of the air hole passage to increase the labyrinth air flow path.

* * * * *